(12) United States Patent
Price et al.

(10) Patent No.: US 7,585,803 B1
(45) Date of Patent: Sep. 8, 2009

(54) CATALYST REGENERATION METHOD

(75) Inventors: Scott J. Price, Chicago, IL (US); Paul R. Cottrell, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 596 days.

(21) Appl. No.: 11/254,100

(22) Filed: Oct. 19, 2005

(51) Int. Cl.
*B01J 23/90* (2006.01)
*B01J 23/96* (2006.01)
*B01J 20/34* (2006.01)
*B01J 21/20* (2006.01)
*B01J 25/04* (2006.01)
*B01J 27/28* (2006.01)
*B01J 29/90* (2006.01)
*B01J 31/40* (2006.01)
*B01J 38/00* (2006.01)
*B01J 38/04* (2006.01)
*B01J 38/42* (2006.01)
*B01J 38/44* (2006.01)
*B01J 39/12* (2006.01)
*B01J 38/34* (2006.01)
*B01J 27/13* (2006.01)

(52) U.S. Cl. .................. 502/43; 502/20; 502/34; 502/35; 502/37; 502/38; 502/230; 208/140

(58) Field of Classification Search .............. 502/20, 502/34, 35, 37, 38, 41, 42, 43, 45, 46, 47, 502/224, 229, 230, 261, 325, 326; 208/140
See application file for complete search history.

(56) References Cited

U.S. PATENT DOCUMENTS

| | | | | |
|---|---|---|---|---|
| 5,034,117 | A * | 7/1991 | De Bonneville et al. | .... 208/140 |
| 5,053,371 | A * | 10/1991 | Williamson | .......... 502/37 |
| 6,048,814 | A * | 4/2000 | Capelle et al. | .......... 502/37 |
| 6,239,055 | B1 * | 5/2001 | Brunet et al. | .......... 502/45 |

* cited by examiner

*Primary Examiner*—J. A. Lorengo
*Assistant Examiner*—Jennifer A Smith
(74) *Attorney, Agent, or Firm*—Mary Ann Maas

(57) ABSTRACT

A method of operating a continuous system for a catalyst regeneration process wherein the regeneration section includes a combustion zone, at least one oxygen boost zone, a halogenation zone and a drying zone in serial progression.

18 Claims, 1 Drawing Sheet

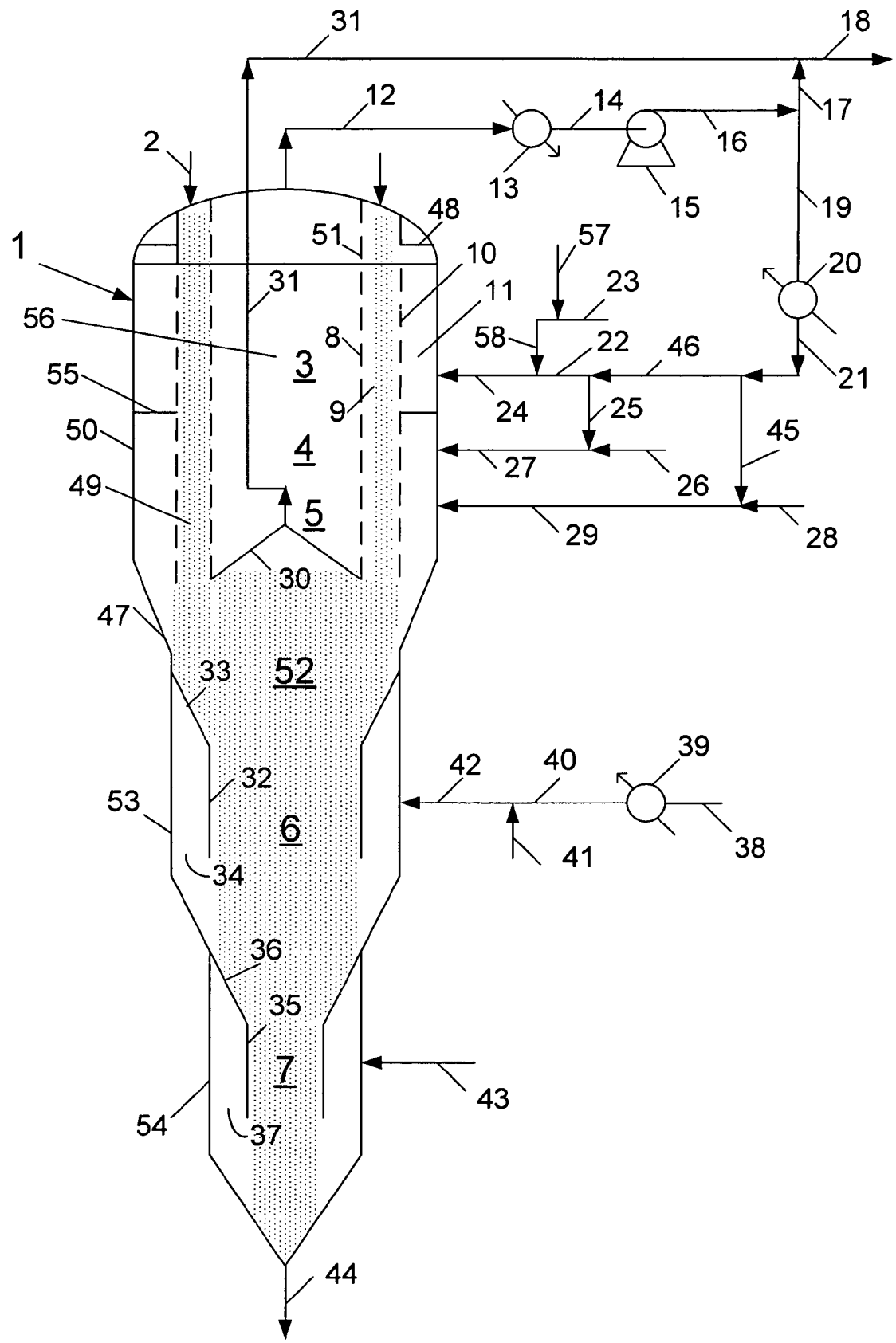

CATALYST REGENERATION METHOD

FIELD OF THE INVENTION

This invention relates to the art of catalytic conversion of hydrocarbons to useful hydrocarbon products. More particularly, the invention relates to the reconditioning or regenerating of spent or deactivated hydrocarbon conversion catalyst to reuse the catalyst in a hydrocarbon conversion reaction.

BACKGROUND OF THE INVENTION

Catalytic processes for the conversion of hydrocarbons using platinum group metals and a catalyst support are well known and extensively used. One such process is reforming and another is olefin production. Eventually the catalysts used in these processes become deactivated for one or more reasons. Where the accumulation of coke deposits causes the deactivation, reconditioning of the catalyst to remove coke deposits restores the activity of the catalyst. Coke is normally removed from catalyst by contact of the coke containing catalyst at high temperature with an oxygen-containing gas to combust and remove the coke in a regeneration process. These processes can be carried out in-situ or the catalyst may be removed from a vessel in which the hydrocarbon conversion takes place and transported to a separate regeneration zone for coke removal. Arrangements for continuously or semi-continuously removing catalyst particles from a reaction zone and for coke removal in a regeneration zone are well known.

In order to combust coke in a typical regeneration zone, a recycle gas is continuously circulated to the combustion zone of a regeneration section and a flue gas containing the by-products of coke combustion, oxygen and water is continually withdrawn. Coke combustion is controlled by recycling a low oxygen concentration gas into contact with the coke-bearing catalyst particles. The flue gas/recycle gas is continuously circulated through the catalyst particles in a recycle gas loop. A small stream of combustion gas is added to the recycle gas to replace oxygen consumed in the combustion of coke and a small amount of flue gas is vented off to allow for the addition of the combustion gas. The steady addition of combustion gas and the venting of flue gas establishes a steady state condition that produces a nearly constant concentration of water and oxygen in the recycle gas.

In prior art regeneration methods, after the combustion zone, the metal-containing catalyst particles pass downwardly to a subadjacent halogenation zone. Chlorine or other halogen-containing gas circulates through the halogenation zone. Contact with the halogenation gas redisperses the platinum group metal on the catalyst particles.

From the halogenation zone, catalyst particles descend into a subadjacent drying zone. A heated gas contacts the catalyst particles and drives moisture from the catalyst. Typically, air or an oxygen-containing gas enters the drying zone as the drying medium and passes upward through the halogenation zones.

In continuous or semi-continuous regeneration processes, coke laden particles are at least periodically added and withdrawn from a bed of catalyst in which the coke is combusted. Regions of intense burning that extend through portions of the catalyst bed develop as the coke is combusted.

The regenerator holds catalyst undergoing regeneration in one or more catalyst beds. Catalyst beds usually take on one of two fluid-flow configurations, a radial flow arrangement, or a vertical flow arrangement. In either type of bed, catalyst particles must downwardly pass freely through the bed to transfer catalyst and obtain a continuous or semi-continuous regeneration. Radial or vertical gas flow through the bed can interfere with the free movement of catalyst particles and hinder the transfer of particles through the bed during the regeneration process.

Experience has shown that horizontal flow of reactants, in particular, through a radial bed of catalyst, can interfere with the gravity flow removal of catalyst particles. This phenomenon is usually referred to as hang-up or pinning and it imposes a constraint on horizontal flow reactor designs. Catalyst pinning occurs when the frictional forces between catalyst pills that resist the downward movement of the catalyst pills are greater than the gravitational forces acting to pull the catalyst pills downward. The frictional forces occur when the horizontal flow vapor passes through the catalyst bed. When pinning occurs, it traps catalyst particles against the outlet screen of the reactor bed and prevents the downward movement of the pinned catalyst particles. In a simple straight reactor bed, or an annular bed with an inward radial flow of vapors, pinning progresses from the face of the outlet screen and as the vapor flow through the reactor bed increases, it proceeds out to the outer surface of the bed at which point the bed is described as being 100% pinned. Once pinning has progressed to the outermost portion of the catalyst bed, a second phenomenon called void blowing begins. Void blowing describes the movement of the catalyst bed away from its outer boundary by the forces from the horizontal flow of vapor and the creation of a void between the inlet screen and the outer catalyst boundary. The existence of this void can allow catalyst particles to blow around or churn and increase catalyst fines. Void blowing can also occur in an annular catalyst bed when vapor flows radially outward through the bed. With radially outward flow, void blowing occurs when the frictional forces between the catalyst pills are greater than the gravitational forces, or in other words, at about the same time as pinning would occur with a radially inward flow. Therefore, high vapor flow can cause void blowing in any type of radial or horizontal flow bed.

The production of fines can pose a number of problems in a continuous moving bed design. The presence of catalyst fines increases the pressure drop across the catalyst bed thereby further contributing to the pinning and void blowing problems. Catalyst fines can also accumulate in the narrow openings of the screen surfaces used to retain the catalyst particles thereby plugging these surfaces and requiring a shut-down of the equipment to remove catalyst fines. Catalyst fines are usually more abrasive than the larger catalyst particles and thereby contribute to greater erosion of the process equipment. Finally, the catalyst in many of these hydrocarbon conversion processes is a valuable commodity and the generation and removal of catalyst fines imposes a direct catalyst cost on the operation of the system.

Where possible, horizontal or radial flow reactors are designed and operated to avoid process conditions that will lead to pinning and void blowing. This is true in the case of moving bed and non-moving bed designs. In vertical or axial flow beds, the upward flow of gases there through can also pose problems of catalyst hang-ups and fluidization. As gas passes upwardly through a bed of particles at low velocity, it migrates through the particles without changing the density of the catalyst bed. As velocity increases, the flow of gas creates drag forces that lift the particles. When these drag forces exceed the weight of the catalyst, frictional forces between the particles drop to zero and the bed approaches a fluidized state. With continued increases in gas velocity, the particles experience lift that tends to transport the particles upwardly out of the bed. Some upward gas flow through the bed is useful since it promotes the movement of catalyst particles by reducing interparticle friction so that the particles flow more as a fluid. However, increasing upward drag forces can suspend catalyst particles and prevent downward catalyst movement. As a result, the upward gas velocity through an axial bed of catalyst particles must be limited to permit gravity flow removal of the catalyst particles.

Accordingly, the problems of hang-up catalyst pinning and void blowing limit the gas velocity through the catalyst beds in the regeneration process. The combustion of a fixed quantity of coke in the regeneration process burns a proportional quantity of oxygen. Supplying the stoichiometric oxygen requirements for the coke combustion demands the circulation of sufficient oxygen through the catalyst bed. Higher oxygen demands during transitory periods of heavy coke burning require a temporary increase in the oxygen supply to the combustion zone of the regeneration section. The oxygen delivery to the combustion zone varies with the gas velocity and oxygen concentration of the gas stream. Since gravity removal of catalyst particles may limit the gas flow velocity, the only ways to increase coke combustion within the catalyst bed is to increase the oxygen concentration or the size of the bed. Physical dimensions of the regeneration section that determine the size of the bed are not easily changed for temporary fluctuations in the process. Charging more air or other oxygen-containing gas to the combustion zone increases the available oxygen for coke combustion. Recycle gas normally has a low oxygen concentration of about 0.5 to 2 mole percent.

However, under upset conditions the catalyst particles may become heavily coked in a hydrocarbon conversion process and then the catalyst particles may not be adequately and fully regenerated during conventional regeneration procedures. In order to recover the activity of heavily coked catalyst particles, it is necessary to contact the coked catalyst particles with a contacting gas containing increased concentrations of oxygen and a sufficient contacting gas flow rate to ensure that the resulting heat of combustion is successfully removed to prevent any possible permanent catalyst damage.

In order to maintain the oxygen concentration in the primary combustion zone of the regenerator at less than about 1.4 mole percent and also to purge halide compounds, water and heat of combustion from the regenerator, nitrogen is added to the regeneration zone gas circulation loop.

INFORMATION DISCLOSURE

U.S. Pat. No. 5,053,371 (Williamson) discloses a catalyst regeneration method for combusting coke from catalyst particles by injecting combustion air for the regeneration section to the three places, upper air to the combustion zone, middle air to the chlorination zone and lower air to the drying zone.

U.S. Pat. No. 6,048,814 (Capelle et al.) discloses a process for regenerating spent catalyst in which the combustion step is conducted in at least two combustion zones, each zone being separated from the adjacent zones and at least one gas charged with oxygen is introduced into each zone, the gases produced being extracted from each zone, and in which the severity of the operating conditions increases in the direction of the flow of the catalyst.

BRIEF SUMMARY OF THE INVENTION

The present invention is a method of operating a continuous system for a catalyst regeneration process wherein the regeneration section includes a combustion zone, at least one oxygen boost zone, and a halogenation zone in serial progression. The present method is particularly suited for the regeneration of a catalyst which has been subjected to severe or upset conditions resulting in a high level of coke deposition on the spent catalyst. The spent catalyst particles containing coke deposited thereon are passed to a combustion zone and contacted with an oxygen-containing recycle gas and added nitrogen gas to combust coke from the catalyst particles. The circulating recycle gas is continuously circulated from a flue gas outlet to a recycle gas inlet while venting a vent gas comprising combustion products from the recycle loop and adding a combustion gas comprising an oxygen-containing gas to the recycle loop. Then the catalyst particles are passed from the combustion zone to the oxygen boost zone or zones and contacted with a portion of the oxygen containing recycle gas and added oxygen to further combust coke from the catalyst particles. The resulting catalyst particles are passed from the oxygen boost zone(s) to the halogenation zone and contacted with a halogen-containing gas to redisperse the metal on the catalyst particles and to dry the catalyst particles in preparation for re-use. In a preferred embodiment, the halogenation zone also serves as a drying zone. In another preferred embodiment, the halogenation and the drying may be conducted in two zones.

Other objects, aspects, embodiments and details of the present invention are disclosed in the following description.

BRIEF DESCRIPTION OF THE DRAWING

The drawing is a schematic illustration of a regeneration zone and a preferred embodiment of the present invention. The above described drawing is intended to be schematically illustrative of the present invention and is not to be a limitation thereof.

DETAILED DESCRIPTION OF THE INVENTION

The most common application for the method of the present invention is the removal of coke from catalyst particles that contain a platinum group metal. The oxidation of the coke at high temperatures in the combustion zone tends to agglomerate metal crystals on the surface of the catalyst. Temperatures in excess of 371° C. (700° F.) for coke combustion causes agglomeration. The present invention is useful for any regeneration section that is required to regenerate a catalyst which contains an excessive amount of coke resulting from severe operating conditions or operational upsets.

However, the most widely practiced hydrocarbon conversion processes to which the present invention is applicable are catalytic reforming and hydrocarbon dehydrogenation. The discussion of the invention contained herein will be in reference to its application to hydrocarbon dehydrogenation.

Hydrocarbon dehydrogenation is a well established hydrocarbon conversion process employed in the petrochemical industry for producing olefin hydrocarbon compounds. The art of hydrocarbon dehydrogenation is well known and does not require detailed description herein.

Briefly, in hydrocarbon dehydrogenation, a feedstock is admixed with a recycle stream comprising hydrogen and contacted with catalyst in a reaction zone. The usual feedstock for a catalytic dehydrogenation process is a hydrocarbon stream containing propane, butane, pentane and mixtures thereof. A hydrocarbon dehydrogenation process is particularly applicable for the production of propylene and butylene.

The hydrocarbon dehydrogenation reaction is normally effected in the presence of catalyst particles comprised of one or more Group VIII noble metals. Of these, the platinum group metals are preferred with platinum, iridium, rhodium and palladium being particularly preferred. The catalyst particles further comprise a halogen combined with a porous carrier such as a refractory inorganic oxide. The halogen is normally chlorine. Alumina is a commonly used carrier. The preferred alumina materials are known as gamma, eta, and theta alumina with gamma and eta alumina giving the best results. An important property related to the performance of the catalyst is the surface area of the carrier. Preferably, the carrier will have a surface area from about 100 to about 500 $m^2$ per gram. The particles are usually spheroidal and have a diameter from about 1.5 to about 3.1 mm ($\frac{1}{16}^{th}$-$\frac{1}{8}^{th}$ inch), though they may be as large as 6.3 mm. In a particular regenerator, however, it is desirable to use catalyst particles which fall in a relatively narrow size range. A preferred catalyst particle diameter is 3.1 mm ($\frac{1}{16}^{th}$ inch). During the course of hydrocarbon dehydrogenation, the catalyst particles become deactivated as a result of mechanisms such as the deposition of coke on the particles. That is, after a period of time in use, the ability of catalyst particles to promote the desired dehydrogenation reaction decreases to the point that the catalyst is no longer useful. The catalyst must then be reconditioned or regenerated before it can be reused in the dehydrogenation process.

In a preferred form, the dehydrogenation process will employ a moving bed reaction zone and regeneration section. The present invention is primarily applicable to a moving bed regeneration section. Fresh catalyst particles are fed to a reaction zone which may be comprised of several subzones and the particles flow through the zone by gravity. Catalyst is withdrawn from the bottom of the reaction zone and transported to a regeneration section wherein a hereinafter described multi-step regeneration process is used to recondition the catalyst to restore its full reaction promoting ability. Catalyst flows via gravity through the various regeneration steps and then is withdrawn from the regeneration section and furnished to the reaction zone. Movement of catalyst through the zones is often referred to as continuous though, in practice, it is semi-continuous. By semi-continuous movement it is meant that there is repeated transfer of relatively small amounts of catalyst at closely spaced points in time. For example, one batch per minute may be withdrawn from the bottom of the reaction zone and withdrawal may take one half minute, that is catalyst will flow for one half minute. If the inventory in the reaction zone is large, the catalyst bed may be considered to be continuously moving. A moving bed system has the advantage of maintaining production while the catalyst is removed or replaced.

When using the method of this invention in a catalyst regeneration process, the catalyst particles are contacted with a hot oxygen-containing gas stream (known in the present instance as recycle gas) in order to remove coke which accumulates on surfaces of the catalyst particles while it is in the hydrocarbon dehydrogenation reaction zone. Coke is comprised primarily of carbon but it is also comprised of a relatively small quantity of hydrogen. The mechanism of coke removal is oxidation or combustion to carbon monoxide, carbon dioxide and water. Coke content of spent catalyst may be as much as 20% of the catalyst weight but 5-7% is a more typical amount. Within the hereinafter described combustion zone, coke is usually oxidized at temperatures ranging from 482° to 538° C. (900°-1000° F.), but temperatures in the combustion zone may vary from an average temperature as low as 399° C. (750° F.) to localized regions that may reach 593° C. (1100° F.) or more. The regeneration section preferably operates at approximately atmospheric pressure.

Oxygen for the initial combustion of coke enters what is called a combustion zone of a regeneration section in what has been termed a recycle gas. The recycle gas contains a low concentration of oxygen usually on the order of 0.5-1.5% by volume. In accordance with the present invention, the oxygen concentration in the recycle gas is monitored and controlled by the selective introduction of nitrogen gas into the recycle gas stream introduced into the initial combustion zone. As the coke is combusted, a smaller amount of hydrogen within the coke reacts with the oxygen to form water. Flue gas made up of carbon monoxide, carbon dioxide, water and unreacted oxygen and other non-reactive gases are collected from the combustion section and withdrawn from the regeneration zone as flue gas. Thus, the recycle gas and flue gas form a recycle gas loop wherein a flue gas stream is continually withdrawn from the process and the recycle gas is admixed with an oxygen-containing gas to replenish consumed oxygen and returned to the initial combustion section as recycle gas. A small amount of the flue gas is vented off from the process to allow the addition of an oxygen-containing gas called combustion gas or make-up gas. One portion of the oxygen-containing gas is combined with a flue gas to replace, in part, the oxygen consumed by the coke combustion and the combined gas is recycled to the initial combustion zone. Since the initial combustion zone is frequently unable to combust all of the coke which is contained on the spent catalyst particles, in accordance with the method of the present invention, the catalyst is advanced to a lower combustion area wherein at least a portion of the traditional recycle gas as described hereinabove is enhanced with additional oxygen-containing gas and introduced into an a oxygen boost zone wherein additional coke combustion is conducted in order to further regenerate the spent catalyst particles. The oxygen boost zone may contain one or more injection points for the recycle gas enhanced with additional oxygen containing gas. Since at least a portion of the coke on the spent catalyst particles has previously been removed in the initial combustion as hereinabove described, the elevated level of oxygen introduced into the oxygen boost zone may be safely increased in order to further combust coke without the danger of subjecting the catalyst particles to undesirable elevated temperatures. In accordance with the method of the present invention, the enhanced recycle gas streams to the oxygen boost zone may contain from about 1.5 to about 4 volume percent oxygen.

All of the oxygen supplied to the initial upper region of the bed of catalyst particles is consumed, since an abundant amount of coke is present. As catalyst particles move downward in the bed and coke is removed, a point is reached where less than all of the oxygen delivered is consumed. This is termed the breakthrough point. Typically, breakthrough occurs at a location spaced about half the distance down the total length of the bed in the combustion section. It is known to those skilled in the art that catalyst particles of the type used in hydrocarbon conversion processes of this invention have a large surface area, which results from existence of a multiplicity of pores. When the catalyst particles reach the breakthrough point in the bed, the coke left on the surface of the particles is deep within the pores and, therefore, the oxidation reaction occurs at a much slower rate.

The combustion of coke also produces water. The only place for the water to escape from the process is in the small amount of vented flue gas. Therefore, the water concentration in the recycle flue increases until the difference between the amount of water entering with the combustion gas streams and the amount of water leaving with the vent stream equal the amount of water produced during the combustion of coke and equilibrium is reached. The water circulating within the recycle gas loop creates a constant steam concentration during the coke combustion process. Since water is detrimental to catalyst life, the water concentration in the recycle loop can be lowered by drying the air that supplies combustion gas, installing a dryer for the gas circulating within the recycle gas loop or other techniques.

The amount of coke that must be combusted in the regenerator section varies with the operation of the reactor section. A number of temporary operational changes will increase the coke combustion requirements and necessitate removal of additional coke. For example, changing feedstock compositions or varying product requirements may alter the operation of the reaction section zone to a high severity operation. High severity operation almost invariably produces more coke. In addition, feedstock contamination or equipment malfunction can result in an upset condition that increases the coke laydown as the dehydrogenation reaction takes place.

An increased coke burn consumes additional oxygen in the combustion zone. The recycle gas must supply this additional oxygen. A heavy coke burn consumes additional oxygen in the combustion zone. The recycle gas must supply this additional oxygen. However, additional oxygen may not be supplied to the initial combustion zone because the high temperatures which would result would be detrimental and damage the catalyst particles. In fact, the circulating recycle gas introduced into the initial combustion zone is required, in accordance with the present invention, to be diluted with nitrogen gas to adjust the oxygen level of the portion of the recycle gas which is introduced into the initial combustion zone.

The portions of the recycle gas which are enhanced with additional oxygen containing gas and introduced into the oxygen boost zone pass through the combustion zones without being depleted of oxygen as is the case in the initial combustion zone. This results in increasing the oxygen concentration in the overall recycle gas exiting the regeneration vessel to a level which cannot be tolerated for introduction into the initial combustion zone. Therefore, that portion of the recycle gas that is to be introduced into the initial combustion zone must be diluted with nitrogen to produce the appropriately reduced level of oxygen in the recycle gas introduced into the initial combustion zone.

When the catalyst particles have sequentially passed through the initial combustion and the oxygen boost zone, the catalyst particles continue their downward flow into the subadjacent halogenation zone. The halogenation step provides the means of incorporating and maintaining the desired level of halogen in the regenerated catalyst particles. The halogen adjustment step employs a halogen or halogen-containing compound in an air or oxygen atmosphere. The air or oxygen-containing gas is preferably introduced into the halogenation zone along with the halogen. The preferred halogen for incorporation into the catalytic composite is chlorine. The preferred halogen utilized during the halogenation step is chlorine. The halogen is usually maintained at a concentration of about 2500 mole ppm in the gas stream through the halogenation zone. An oxygen atmosphere is generally employed and desired in conducting the halogenation step. Therefore, it is preferred to introduce an oxygen-containing stream into the halogenation zone. The presence of oxygen aids in the dispersion of the metallic catalyst components on the carrier particles. A low water concentration can facilitate the halogenation step. The concentration of chlorine in the halogenation zone is governed by the Deacon equilibrium equation:

$$HCl + O_2 \leftrightarrow H_2O + Cl_2$$

Therefore, to the extent that the catalyst entering the halogenation zone has a lower water concentration, it will shift the equation to the right to produce more chlorine for the halogenation step.

After passing through the halogenation zone, the catalyst particles travel downwardly into a subadjacent drying zone for the removal of water formed in the combustion zone that remains on the catalyst particles. The typical arrangement for drying the catalyst particles introduces a heated air stream into the drying zone of the regenerator and contacts the catalyst particles in a generally countercurrent flow. Relatively dry catalyst particles are withdrawn from the bottom of the regenerator and the water-containing and oxygen-containing gas stream flows upwardly out of the drying zone. Drying zone temperatures are preferably in the range of 399°-510° C. (750°-950° F.). In a preferred embodiment of the present invention, the halogenation and drying steps may be simultaneously conducted in a single zone.

DETAILED DESCRIPTION OF THE DRAWING

The hereinafter description of the drawing is one embodiment of the present invention and is not intended to limit the broad scope of the invention as presented in the claims. The drawing shows only elements and equipment which are essential to a clear understanding of the invention. Application and use of additional required items are well within the purview of one skilled in the art.

Referring now to the drawing, spent catalyst particles are introduced into regeneration vessel 1 by means of conduits 2 and the catalyst particles flow into an annular catalyst bed 9 formed by an outer catalyst retention screen 10 and an inner catalyst retention screen 8. The volume of the catalyst particles in the upper section of regeneration vessel 1 is located in combustion zone 3. Retention screens 8 and 10 may be cylindrical in form and concentric with the regeneration vessel 1. Retention screens 8 and 10 are perforated with holes that are large enough to allow gas to pass through the annular catalyst bed 9 but not permit the passage of catalyst particles therethrough. Outer catalyst retention screen 10 extends downward from the bottom of conduits 2 to a swedge section 47 of regeneration vessel 1. Supports 48 guide the top of outer retention screen 10 and keep it centered in regeneration vessel 1. Inner catalyst retention screen 8 is attached to the top head of regeneration vessel 1 and extends downward therefrom to a point slightly above the lower end of outer catalyst retention screen 10. The bottom of the inner catalyst retention screen 8 is attached to an impervious baffle 30 which communicates with line 31 to allow an upwardly flowing gas from reconditioning zone 6, as will be described hereinafter. The bottom 49 of the annular catalyst bed 9 is open to allow catalyst particles to empty from the catalyst bed into the reconditioning zone 6 of regeneration vessel 1. From the bottom 49, the catalyst particles fill the reconditioning zone 6 of regeneration vessel 1. Reconditioning zone 6 serves as a reconditioning zone for the catalyst particles wherein the particles are statically supported by catalyst particles that extend to the bottom end closure of regeneration vessel 1. The catalyst particles are periodically transferred by withdrawing a predetermined volume of catalyst through line 44 which in turn allows all the catalyst particles to slump downwardly through the previously described zones.

As the catalyst particles travel downwardly through the regeneration process, they pass generally through combustion zone 56 and more specifically through combustion zone 3 which is centrally located with respect to the previously described annular catalyst bed 9. Looking now at the flow of gas streams in the regeneration system, recycle gas that enters the combustion zone 3 through line 24 is distributed in an annular chamber 11 that extends around outer catalyst retention screen 10 and is defined on its sides by outer catalyst retention screen 10 and the vessel wall 50 of regeneration vessel 1 and on its bottom by swedge section 47. An upper portion 51 of inner catalyst retention screen 8 is impervious to gas flow, or blanked off to prevent gas flow from annular chamber 11 across the top of the regeneration vessel 1. As the recycled gas passes through catalyst bed 9, oxygen is consumed in the combustion of coke. The gas that exits the catalyst bed 9 is collected in combustion zone 3. The process of combusting coke removes chloride from the catalyst particles and therefore the gas from annular catalyst bed 9 contains not only water and carbon dioxide but also chloro species such as chlorine and hydrogen chloride.

The gas that collects in combustion zone 3 of regeneration vessel 1 is referred to herein as flue gas and includes not only gas from annular catalyst bed 9 but from oxygen-containing gas flowing upward from combustion zones 4 and 5. Thus, the flue gas that collects in combustion zone 3 includes gas that would be vented from regeneration vessel 1 as well as gas that will be recycled through annular chamber 11. The flue gas stream leaves combustion zone 3, more generally combustion zone 56, via line 12 and is introduced into heat exchanger 13. A resulting cooled flue gas stream is removed from heat exchanger 13 via line 14 and introduced into compressor 15. A resulting compressed flue gas stream is removed from compressor 15 via line 16 and a first portion is vented from the process via lines 17 and 18. Another portion is carried via line 19 and introduced into heater 20. Heater 20 heats the recycle gas stream to carbon-burning temperatures during startup and to a lesser degree adds heat to the recycle gas stream during normal operation. Heater 20 operates in conjunction with the heat exchanger 13 to regulate the heat content of the recycled gas stream. A resulting heated recycle gas stream is removed from heater 20 and carried via line 21 and at least a portion is carried via lines 46 and 22 and is admixed with an oxygen-containing gas provided via lines 23 and 58, and a nitrogen stream carried by lines 57 and 58 and the resulting admixture is carried via line 24 and introduced into annular chamber 11. This gas passes radially from annular chamber 11 through outer catalyst retention screen 10, annular catalyst bed 9 and inner catalyst retention screen 8 into combustion zone 3. Baffle 55 aids in preventing the flow of gas into the lower section of annular chamber 11 thereby minimizing the admixture of gas from line 24 with gas from lines 27 and 29. Another portion of the heated recycle gas is transported via lines 21, 46 and 25, and is admixed with an oxygen-containing gas provided via line 26 and the resulting admixture is carried via line 27 and introduced into annular chamber 11. This gas passes from annular chamber 11 through outer catalyst retention screen 10, annular catalyst bed 9 and inner catalyst retention screen 8 into combustion zone 4 in a generally radial fashion. Another portion of the heated recycle gas stream is carried via lines 21 and 45 and admixed with an oxygen-containing gas provided via line 28 and the resulting admixture is carried via line 29 and introduced into annular chamber 11. The gas from annular chamber 11 passes through outer catalyst retention screen 10, annular catalyst bed 9, and inner catalyst retention screen 8 into combustion zone 5 in a generally radial fashion.

An oxygen-containing gaseous stream is introduced into the process via line 38 and introduced into heat exchanger 39 which raises the temperature of the gaseous stream to about 538° C. (1000° F.). The heated oxygen-containing gas is removed from heat exchanger 39 via line 40 and admixed with a chlorine stream provided via line 41 and gives the mixed stream a chlorine concentration of about 0.1 mol %. The mixed stream of chlorine and heated oxygen-containing gas enters the reconditioning zone 6. Catalyst below combustion zone 5 is contacted with the stream of chlorine and heated oxygen-containing gas that enters the reconditioning zone 6 through line 42. Most of the entering gas, including most of the oxygen, as well as some of the chlorine and some hydrogen chloride produced from the chlorine, reaches an upper portion of the reconditioning zone 6 and passes into a central portion 52 of the regeneration vessel 1. The gas that passes through the central portion 52 is directed by impervious baffle 30 to and upward through line 31 and is removed from regeneration vessel 1 via lines 31 and 18. The catalyst at the bottom of central portion 52 flows into the reconditioning zone 6 of regeneration vessel 1. Reconditioning zone 6 is formed by a baffle having a vertically extended cylindrical section 32 that is concentrically located with respect to the regeneration vessel 1. Previously described heated chlorine-containing, oxygen-containing gas enters via line 42 into an annular volume 34 that distributes the gas. Annular volume 34 is defined by the wall of lower vessel section 53 and an imperforate baffle comprising a vertically extended cylindrical section 32 that is secured to the lower vessel section 53 by frusto-conical section 33. An open bottom of annular volume 34 allows gas to be distributed about the entire circumference of the annular volume 34 and about the reconditioning zone 6. Catalyst duration within the reconditioning zone 6 is governed principally by the length of reconditioning zone 6. In this example, the reconditioning zone 6 has a sufficient length to provide approximately a 4-hour residence time for the particles located therein.

After removal of coke and reconditioning of the catalyst particles in the regeneration vessel 1, the catalyst particles are passed downwardly into drying zone 7. Drying zone 7 is formed by an imperforate baffle having a vertically extended cylindrical section 35 that is concentrically located with respect to the regeneration vessel 1. A heated oxygen-containing drying gas is introduced into the process via line 43 and passes into an annular volume 37 that distributes the gas. Annular volume 37 is defined by the wall of the lower vessel section 54 and a baffle comprising a vertically extended cylindrical section 35 that is secured to the lower vessel section 54 by frusto-conical section 36. An open bottom of annular volume 37 allows gas to be distributed about the entire circumference of the annular volume 37 and about the drying zone 7. Catalyst duration within the drying zone 7 is governed principally by the length of the drying zone 7. In this example, the drying zone has a sufficient length to provide approximately a 4-hour residence time for the particles located therein. The resulting dried catalyst particles are passed downwardly from drying zone 7 to the lower end of regeneration vessel 1 and are removed therefrom via line 44. The gas flow through reconditioning zone 6 and drying zone 7 is generally axial flow.

The foregoing description and drawing clearly illustrate the advantages encompassed by the method of the present invention and the benefits to be afforded with the use thereof.

What is claimed is:

1. A method of operating a continuous system for a catalyst regeneration process wherein a regeneration section includes at least a combustion zone, at least one oxygen boost zone, and a halogenation zone which method comprises:

a) continuously circulating an oxygen-containing recycle gas from a flue gas outlet to a recycle gas inlet in a recycle gas loop, venting a vent gas comprising combustion products from the recycle gas loop and adding gas to the recycle gas loop;

b) passing catalyst particles containing a platinum group metal and having coke deposited thereon to the combustion zone and contacting the catalyst particles with a portion of the oxygen-containing recycle gas and added nitrogen gas to combust coke from the catalyst particles, wherein the oxygen-containing recycle gas and the added nitrogen gas together comprises from about 0.5 to about 1.5 volume percent oxygen;

c) passing the catalyst particles from the combustion zone to the oxygen boost zone and contacting the catalyst particles with a portion of the oxygen-containing recycle gas enhanced with additional oxygen containing gas to further combust coke from the catalyst particles, wherein the recycle gas enhanced with additional oxygen containing gas comprises from about 1.5 to about 4 volume percent oxygen and the recycle gas enhanced with additional oxygen containing gas in the oxygen boost zone has an elevated level of oxygen as compared to the oxygen-containing recycle gas and the added nitrogen gas together in the combustion zone;

d) passing the catalyst particles from the oxygen boost zone to the halogenation zone and contacting the catalyst particles with a halogen-containing gas and redispersing the platinum group metal on the catalyst particles; and e) recovering a regenerated catalyst from the regeneration section.

2. The method of claim 1 wherein the platinum group metal is on an alumina support and a halogen component.

3. The method of claim 1, further comprising passing the recycle gas transversely across a continuous bed of catalyst particles extending vertically through the combustion zone and the oxygen boost zone.

4. The method of claim 1, further comprising operating the combustion zone at a temperature from about 477° C. (890° F.) to about 600° C. (1112° F.).

5. The method of claim 1, further comprising maintaining the oxygen boost zone at a temperature from about 460° C. (860° F.) to about 538° C. (1000° F.).

6. The method of claim 1, further comprising maintaining the halogenation zone at a temperature from about 400° C. (752° F.) to about 480° C. (896° F.).

7. The method of claim 1, further comprising adding the gas in step a) in an amount substantially equal in mass flow to the amount of the vent gas exiting the recycle gas loop.

8. The method of claim 1 further comprising adding the nitrogen gas to the recycle gas inlet.

9. The method of claim 1, further comprising venting the halogen containing gas.

10. The method of claim 1, further comprising performing step c) substantially immediately after performing step b), performing step d) substantially immediately after performing step c) and performing step e) substantially immediately after performing step d).

11. The method of claim 1, comprising a first oxygen boost zone and a second oxygen boost zone, after step c) and before step d), passing the catalyst particles to the second oxygen boost zone and contacting the catalyst particles with a second inlet gas comprising a portion of the oxygen-containing recycle gas and added oxygen to further combust coke from the catalyst particles.

12. The method of claim 11 wherein the first and the second oxygen boost zones are maintained at a temperature from 460° C. (860° F.) to about 538° C. (1000° F.).

13. A method of operating a continuous system for a catalyst regeneration process wherein a regeneration section includes at least a combustion zone, at least one oxygen boost zone, and a halogenation zone which method comprises:

a) continuously circulating an oxygen-containing recycle gas from a flue gas outlet to a recycle gas inlet in a recycle gas loop, and adding nitrogen gas to the recycle gas loop;

b) passing catalyst particles containing platinum and having coke deposited thereon to the combustion zone and contacting the catalyst particles with a portion of the oxygen-containing recycle gas and added nitrogen gas to combust coke from the catalyst particles;

c) passing the catalyst particles from the combustion zone to the oxygen boost zone and, in the oxygen boost zone, contacting the catalyst particles with gas comprising a portion of the oxygen-containing recycle gas and added oxygen to further combust coke from the catalyst particles wherein the oxygen content of the gas comprising a portion of the oxygen-containing recycle gas and added oxygen in the oxygen boost zone is at an elevated level of oxygen as compared to oxygen-containing recycle gas with the added nitrogen gas of the combustion zone;

d) passing the catalyst particles from the oxygen boost zone to the halogenation zone and contacting the catalyst particles with a halogen-containing gas and redispersing the platinum metal on the catalyst particles;

e) recovering a regenerated catalyst from the regeneration section.

14. The method of claim 13, further comprising passing the recycle gas transversely across a continuous bed of catalyst particles extending vertically through the combustion zone and the oxygen boost zone.

15. The method of claim 13, wherein the recycle gas and added nitrogen gas together comprises from about 0.5 to about 1.5 mole percent oxygen.

16. The method of claim 13, wherein the recycle gas and added oxygen comprises from about 1.5 to about 4 mole percent oxygen.

17. The method of claim 13, further comprising performing step c) substantially immediately after performing step b), performing step d) substantially immediately after performing step c) and performing step e) substantially immediately after performing step d).

18. A method of operating a continuous system for a catalyst regeneration process wherein a regeneration section includes at least a combustion zone, at least one oxygen boost zone, and a halogenation zone which method comprises:

a) continuously circulating an oxygen-containing recycle gas from a flue gas outlet to a recycle gas inlet in a recycle gas loop, adding gas to the recycle gas loop;

b) passing catalyst particles to a combustion zone and contacting the catalyst particles with a portion of the oxygen-containing recycle gas and added gas wherein wherein the oxygen-containing recycle gas and the added gas together comprises from about 0.5 to about 1.5 volume percent oxygen;

c) passing the catalyst particles from the combustion zone to an oxygen boost zone and contacting the catalyst particles with a portion of the oxygen-containing recycle gas enhanced with additional oxygen containing gas, wherein the recycle gas enhanced with additional oxygen containing gas comprises from about 1.5 to about 4 volume percent oxygen and the recycle gas enhanced with additional oxygen containing gas in the oxygen boost zone has an elevated level of oxygen as compared to the oxygen-containing recycle gas and the added nitrogen gas together in the combustion zone;

d) passing the catalyst particles from the oxygen boost zone to a halogenation zone and contacting the catalyst particles with the halogen-containing gas;

e) venting at least one of the halogen-containing gas or a vent gas comprising combustion products from the recycle gas loop; and f) recovering a regenerated catalyst from the regeneration section.

* * * * *

UNITED STATES PATENT AND TRADEMARK OFFICE
CERTIFICATE OF CORRECTION

PATENT NO. : 7,585,803 B1  
APPLICATION NO. : 11/254100  
DATED : September 8, 2009  
INVENTOR(S) : Price et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 781 days.

Signed and Sealed this

Fourteenth Day of September, 2010

David J. Kappos  
*Director of the United States Patent and Trademark Office*